United States Patent
Seshadri et al.

(10) Patent No.: US 8,481,907 B2
(45) Date of Patent: Jul. 9, 2013

(54) MAPPING ELECTRICAL CROSSTALK IN PIXELATED SENSOR ARRAYS

(75) Inventors: Suresh Seshadri, West Covina, CA (US); David Cole, Glendale, CA (US); Roger M Smith, LaCanada Flintridge, CA (US); Bruce R. Hancock, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 673 days.

(21) Appl. No.: 12/009,595

(22) Filed: Jan. 18, 2008

(65) Prior Publication Data
US 2010/0020099 A1 Jan. 28, 2010

(51) Int. Cl.
*H01L 27/00* (2006.01)
*H01J 40/14* (2006.01)

(52) U.S. Cl.
USPC .................................. 250/208.1; 250/214 R

(58) Field of Classification Search
USPC ............. 250/208.1, 206, 214 R, 214.1, 214 P, 250/214 AG; 348/192, 193, 294, 302, 308, 348/187, 181, 311; 257/258, 257, 290, 291, 257/431, 443, 444, 445, 428
See application file for complete search history.

(56) References Cited

U.S. PATENT DOCUMENTS 5,694,495 A * 12/1997 Hara et al. ..................... 382/324
7,554,584 B2 * 6/2009 Lim .............................. 348/241

OTHER PUBLICATIONS

Moore, Andrew C., et al., "Operation and Test of Hybridized Silicon p-i-n Arrays Using Open-source Array Control Hardware and Software", 14, May 14, 2003.
Finger, Gert et al., "Conversion Gain and Interpixel Capacitance of CMOS Hybrid Focal Plane Arrays", 477-490, Jan. 1, 2005.
Finger, Gert et al., "Interpixel Capacitance in Large Format CMOS Hybrid Arrays", 13, Jun. 15, 2006.
Moore, Andrew "QE Overstimation and Deterministic Crosstalk Resulting from Inter-pixel Capacitance", 10, Jul. 6, 2006.
Moore, Andrew C., et al., "Interpixel Capacitance in Non-destructive Focal Plane Arrays", 12, Jan. 12, 2004.

* cited by examiner

*Primary Examiner* — Que T Le
*Assistant Examiner* — Jennifer Bennett
(74) *Attorney, Agent, or Firm* — Steinfl & Bruno LLP

(57) ABSTRACT

The effects of inter pixel capacitance in a pixilated array may be measured by first resetting all pixels in the array to a first voltage, where a first image is read out, followed by resetting only a subset of pixels in the array to a second voltage, where a second image is read out, where the difference in the first and second images provide information about the inter pixel capacitance. Other embodiments are described and claimed.

8 Claims, 3 Drawing Sheets

MAPPING ELECTRICAL CROSSTALK IN PIXELATED SENSOR ARRAYS

GOVERNMENT INTEREST

The invention claimed herein was made in the performance of work under a NASA contract, and is subject to the provisions of Public Law 96-517 (35 USC 202) in which the Contractor has elected to retain title.

BACKGROUND

For some systems employing pixilated sensor arrays or MEMS (Micro-Electrical-Mechanical Systems) arrays, it is desirable to measure the capacitance at each element (pixel) in the array. For example, the detection of electromagnetic radiation comprises several steps, including photon capture, collection of photo-generated charges, and sensing the corresponding voltages. Capacitive coupling between pixels may induce errors in their corresponding sensed voltages, which may lead to inaccurate image values. This capacitive coupling may affect the electronic gain and linearity of each pixel. Capacitive coupling causes the photo-generated charge on a pixel to induce a voltage on one or more adjacent or nearby pixels, leading to cross-talk when the voltages are sensed.

For some systems employing pixilated sensor arrays or MEMS (Micro-Electrical-Mechanical Systems) arrays, it is desirable to measure the capacitance at each element (pixel) in the array. For example, the detection of electromagnetic radiation comprises several steps, including photon capture, carrier diffusion, collection of photo-generated charges, and sensing the corresponding voltages. Capacitive coupling between pixels may induce errors in their corresponding sensed voltages, which may lead to inaccurate image values. This capacitive coupling may affect the electronic gain and linearity of each pixel. Capacitive coupling causes the photo-generated charge on a pixel to induce a voltage on one or more adjacent or nearby pixels, leading to cross-talk in the sensed voltages in each pixel.

It is desirable to provide a map of capacitive coupling for all elements in a pixelated array, which may be useful in calibration procedures.

DESCRIPTION OF EMBODIMENTS

In the description that follows, the scope of the term "some embodiments" is not to be so limited as to mean more than one embodiment, but rather, the scope may include one embodiment, more than one embodiment, or perhaps all embodiments.

Figure 1:
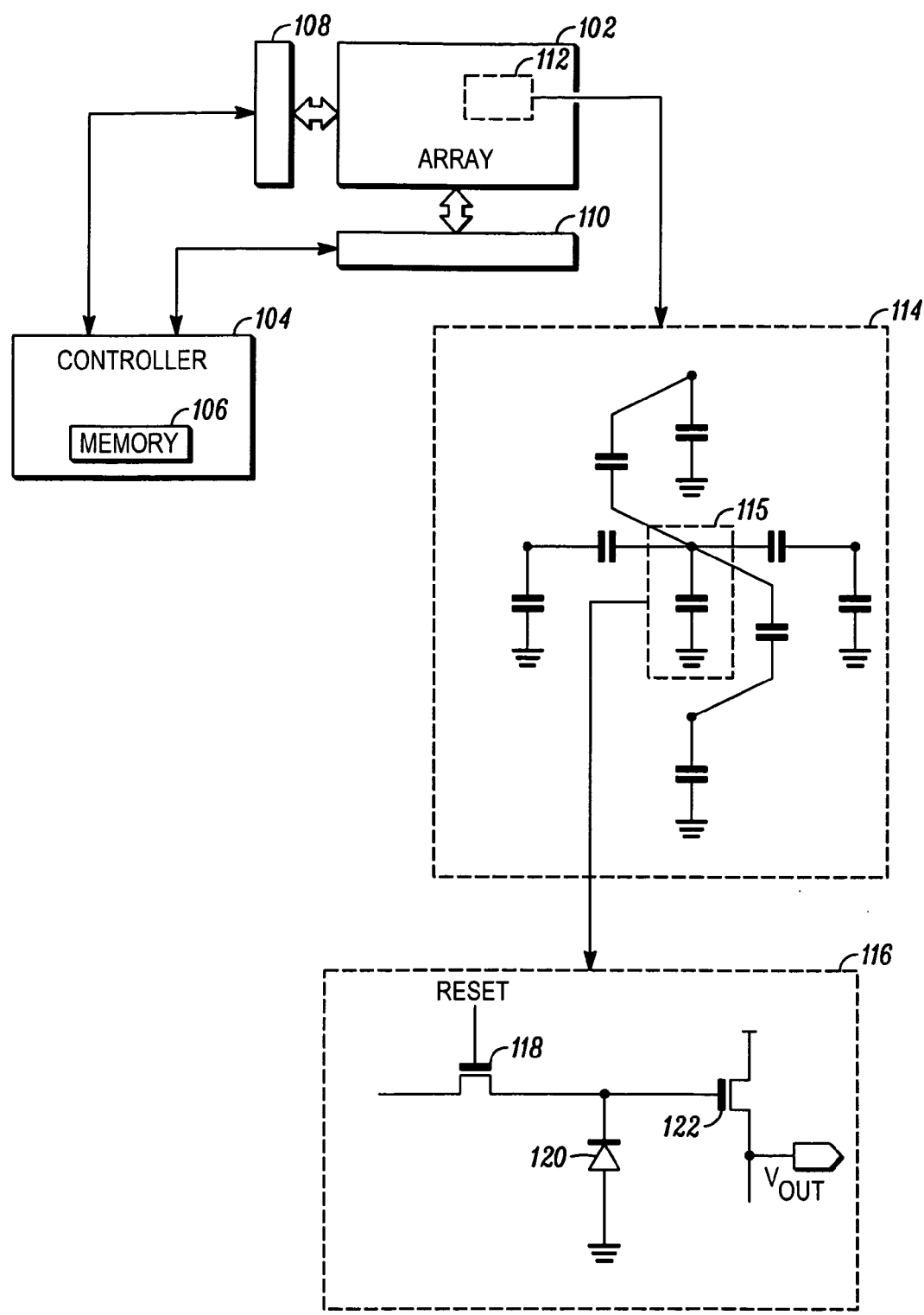
FIG. 1 illustrates an array of pixels and controller according to an embodiment.

FIG. 1 illustrates a system according to an embodiment, where a procedure for measuring capacitance coupling among pixels in array 102 is carried out by control system 104 under instructions stored in computer readable media (memory) 106. The procedure stored in computer readable media 106 will be described later. Readout electronics 108 and 110 read out the pixel voltages in array 102, as well as providing various control signals to array 102.

Depicted in pictorial form in FIG. 1 is a subset array of pixels, denoted by dashed rectangle 112. This subset is modeled, as indicated in dashed rectangle 114, as a set of nodes, each one having a node capacitance to ground (substrate). A node with a capacitor to ground represents a pixel. The model of 114 indicates capacitive coupling between center pixel 115 and its four nearest neighbor pixels. The model indicated by 114 is overly simplified because it does not explicitly show all pairs of coupling capacitors between the pixels, and does not show capacitive coupling to pixels that are not nearest neighbors. In practice, there may be capacitive coupling between a pixel and its next-to-nearest neighboring pixels, as well as other pixels.

Pixel 115 is modeled at the circuit level within dashed rectangle 116. Pixel 116 comprises reset transistor 118, photodetector 120, and transistor 122 configured as a source follower (buffer). The source terminal of transistor 122 is connected to other circuit components, such as a readout circuit, but for simplicity such a connection is not shown. The output voltage, $V_{OUT}$, is taken at the source terminal of transistor 122. When the reset voltage on the gate of transistor 118 is HIGH, transistor 118 is turned ON to provide a reset voltage to photodetector 120, so that the capacitance of photodetector 120 is charged. (In 114, the capacitance for photodetector 120 is shown as a capacitor from a node to ground.) After reset, transistor 118 is turned OFF. During image capture, photons absorbed by photodetector 120 cause electron-hole pairs, which discharge the capacitance. During readout, the output voltage $V_{OUT}$ is indicative of this charge.

Pixels for other embodiments may be modeled differently than as illustrated in FIG. 1. That is, some embodiments may utilize pixels in which the model of FIG. 1 is not applicable, or where other models may be more accurate.

Embodiments provide results indicative of capacitive coupling in a sensor array by reading out all pixel voltages when each pixel in the array has been reset to a first reset voltage, and by reading out all pixel voltages when a second reset voltage, different from the first reset voltage, is used to reset only those pixels in a subset of the pixels in the array. The pixels not in the subset are reset to the first reset voltage. During this procedure, it is not necessary that the array is sensing an applied image, so that the embodiments may be utilized when the sensor array is kept dark. This procedure may be repeated for various subsets, so that for some embodiments each pixel would have had an opportunity to be reset at the second reset voltage. Signal processing-schemes may be applied to these pixel voltages to provide metrics indicative of the capacitive coupling.

To describe one or more embodiments in more detail, it is convenient to consider that the pixels and their corresponding voltages in a sensor array may be indexed according to their row and column numbers. Accordingly, let $v_0(i,j)$ denote the output voltage of a pixel at position (i,j) obtained from a readout when all pixels in the array have been reset to voltage $v_0$; and let $v_1(i,j)$ denote the output voltage of a pixel at position (i,j) obtained from a readout when all pixels but some subset in the array have been reset to voltage $v_0$, and where the pixels in the subset have been reset to voltage $v_1$.

Suppose the index i ranges over the integer set $\{1, 2, \ldots, N\}$, and the index j ranges over the integer set $\{1, 2, \ldots, M\}$. To make the notation concise, these integer sets may be denoted as I and J, respectively. Accordingly, the set $\{v_0(i,j), i \in I, j \in J\}$ may be considered an image, and likewise the set $\{v_1(i,j), i \in I, j \in J\}$ may be considered another image. An ensemble of such images may be accumulated so that average (or baseline) images may be provided. That is, for some embodiments, multiple readouts of the entire array of pixels are made to provide an ensemble of voltages $v_0(i,j)$ and $v_1(i,j)$, followed by averaging to provide an average of $v_0(i,j)$ over the ensemble and an average of $v_1(i,j)$ over the ensemble. Additional notation could be added to $v_0(i,j)$ and $v_1(i,j)$ to denote their averages, but for ease of presentation such additional notation will not be introduced. In light of this, it should be noted that when considering the description below, that for some embodiments, $v_0(i,j)$ and $v_1(i,j)$ may represent averages over an ensemble of measurements.

A difference $v_1(i,j)-v_0(i,j)$ may be calculated for each index pair (i,j) to provide a set of differences. This set of differences, which may be termed a difference image, is indicative of the capacitive coupling between pixels, and may depend upon the particular choice of subset of pixels that were reset to the voltage $v_1$. It is convenient to denote this dependence by introducing s to represent a subset of pixels. The difference $d(i,j,s)=v_1(i,j)-v_0(i,j)$ may then be calculated for each pair (i,j) for some subset s. This gives a set of differences $\Delta(s)=\{d(i,j,s), i \in I, j \in J\}$. A family of such sets may be provided by performing the above-described procedure for a family of subsets. The family of subsets may be chosen to cover the entire array.

As a particular example, a subset may be chosen such that each pixel in the subset is separated from its nearest neighbor by 6 pixels. That is, we might choose a subset comprising pixels at positions $\{(i,j), i=1, 7, 14, 21, \ldots; j=1, 7, 14, 21, \ldots\}$. There will be edge effects, so for simplicity assume that N and M are multiples of 7. This subset may be denoted as $s_1$. Another subset may be chosen by shifting this subset by one position, either in a row direction or a column direction, unless of course the edge of the array has already been bumped into. For example, a second subset may be the set of positions $\{(i,j), i=2, 8, 15, 22, \ldots; j=1, 7, 14, 21, \ldots\}$. This subset may be denoted as $S_2$. This process may be repeated, each time shifting a subset to obtain a new subset, so that the family of all subsets covers the entire array.

In the absence of a gradient in either the first or second reset voltages across the imager, or alternatively, in the presence of an identical gradient in both the first and second reset voltages, the voltage coupling for each pixel may be directly determined from the difference image, $\Delta(s)=\{d(i,j,s), i \in I, j \in J\}$. For the ideal case in which there is no capacitive coupling, the image would only have the difference voltage for the pixels that had the second reset voltage applied. If coupling is present, then this difference image will directly give the sum of the coupling voltages from all coupling interactions, in pixels surrounding the reset pixel. Thus, there is not only the effect of the reset pixel on the nearest neighbor pixels, but also the sum of the change in the nearest neighbors and the central reset pixel on the next-nearest-neighbor, and vice versa.

There may be embodiments for which a gradient in the first reset image is not cancelled out by the second reset image, or vice versa. If the gradient is in voltage only, the resulting image still gives the voltage-to-voltage coupling accurately, but at voltage differences that correspond to the gradient. If the gradient is in the illumination, then the voltage-to-voltage coupling may be analyzed by an iterative solution that uses the preferred electronic gain calculation to convert the gradient in illumination to a voltage, followed by calculating the induced coupling, and then re-calculating the correct electronic gain, per pixel. This procedure may be repeated until convergence is achieved. This latter approach should also be performed if there is significant non-linearity in the output voltage of the pixels, relative to the two pixel values in the before and after images.

Figure 2:
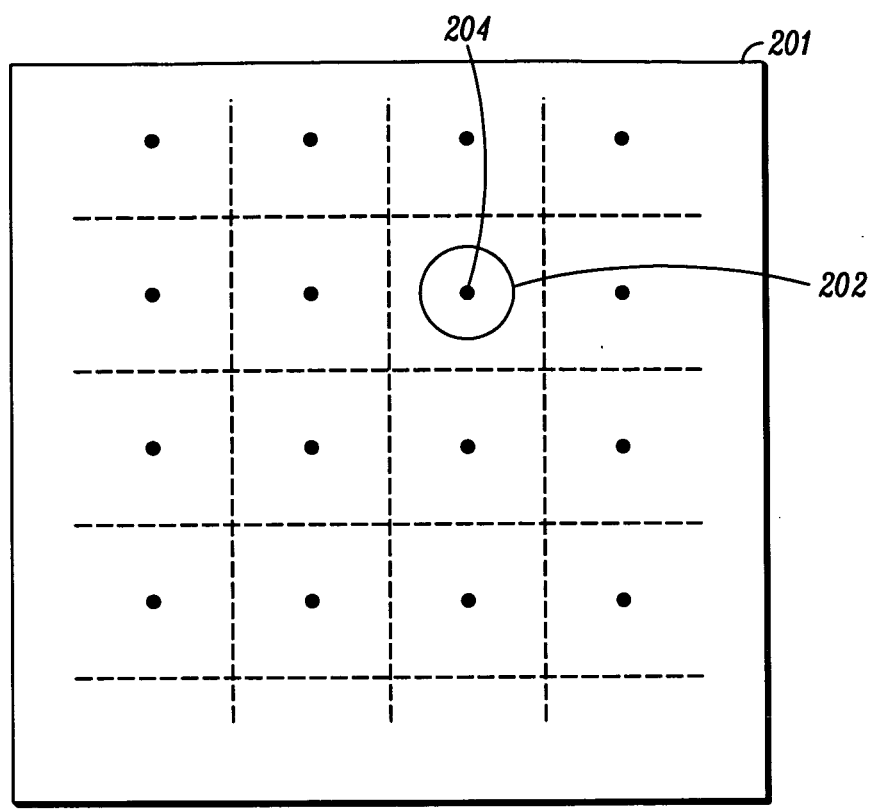
FIG. 2 illustrates a subset of pixels with associated cells and annuli according to an embodiment.

For some embodiments, the set $\Delta(s)=\{d(i,j,s), i \in I, j \in J\}$ may be processed to mitigate effects due to local spatial variation in the array. For some embodiments, this procedure may be described as follows. The array may be divided into a contiguous family of cells, each cell being a contiguous set of pixels that includes one and only one pixel belonging to the subset s. That is, there is a one-to-one correspondence between the pixels in the set s and the set of cells. Except near the edges of the array, for some embodiments the center of a cell may be the pixel in that cell belonging to s. Generally, given a pixel position (k,l) that belongs to the subset s, the cell associated with (k,l) are those (i,j) for which the distance between (k,l) and (i,j) is less than or equal to the distance between (i,j) and any other pixel in the subset s. FIG. 2 illustrates this, where the dots in array 201 represent a portion of the subset of pixels s that are reset to $v_1$. The dashed lines divide the array into cells. (Not all cells are shown.)

About each pixel belonging to the subset s, a locus of pixels may be defined, where the locus is inside the cell associated with the pixel. For example, locus 202 is drawn around pixel 204 in FIG. 2. Of course, the locus is not continuous, but is meant to represent the set of pixels within a cell that are at some given distance from the pixel in the cell belonging to the subset s. For cells near the edge, the corresponding locus may be truncated by the edge.

For any pixel position (i,j), there is one and only one cell containing (i,j), and that cell contains a pixel position that also belongs to the subset s. Denote this pixel position as (i*,j*). (It depends also upon the choice of subset s.) Note that if the pixel position (i,j) belongs to the subset s, then i*=i and j*=j. For the particular example in FIG. 2, (i*,j*) is in the center of the shown cells. For the cell containing (i,j), an average over the locus associated with that cell may be calculated. More specifically, for any pixel position (i,j), let a(i*,j*,s) denote the average of the values d(m,n,s) on the locus of points (m,n) associated with the cell containing (i,j). With this notation in mind, some embodiments provide the values $$\hat{d}(i, j, s) = \frac{d(i, j, s) - a(i^*, j^*, s)}{d(i^*, j^*, s) - a(i^*, j^*, s)}.$$

Note that $\hat{d}(i,j,s)$ is normalized to be less than or equal to one, and that $\hat{d}(i^*,j^*,s)=1$.

For each subset s, the set $\hat{\Delta}(s)=\{\hat{d}(i,j,s), i \in I, j \in J\}$ may be calculated as discussed above. Furthermore, a family of these sets may be calculated for a family of subsets s that cover the array. This family of sets may provide information about the capacitive coupling among pixels in an array, and to what degree capacitive coupling is important as a function of intra pixel distance. For example, for a particular subset s, all $\hat{d}(i,j,s)$ for which (i,j) and (i*,j*) are nearest neighbors provides information about the capacitive coupling among nearest neighbors; all $\hat{d}(i,j,s)$ for which (i,j) and (i*,j*) are next-to-nearest neighbors provides information about the capacitive coupling among next-to-nearest neighbors; and so forth. As a result, histograms may be generated based upon this family of sets, yielding information about the degree of capacitive coupling. For some arrays, such histograms may show that capacitive coupling is not important for sufficiently large intra pixel distance. For example, for some embodiments, capacitive coupling has been found to be important only for nearest neighbors.

Some embodiments may provide a voltage-to-voltage coupling factor for next neighbors and next-to-nearest neighbors. For example, for a regular two dimensional array (ignoring edge effects), pixel (i,j) has four nearest neighbors, pixels (i−1,j), (i+1,j), (i,j−1), and (i,j+1), and four next-to-nearest neighbors, pixels (i−1,j−1), (i+1,j−1), (i−1,j+1), and (i+1,j+1). Let k and l denote relative pixel index values such that $d_{i,j}(k,l,s)$ references voltage differences for the nearest and next-to-nearest neighbors to pixel (i,j). That is, the (k,l) index pairs (−1,0), (1,0), (0,−1), and (0,1) delineate the nearest neighbors to pixel (i,j), and the (k,l) index pairs (−1,−1), (−1,1), (1,−1), and (1,1) delineate the next-to-nearest neighbors to pixel (i,j). With this notation, some embodiments may provide coupling factors $D_{i,j}(k,l,s)$ where $$D_{i,j}(k,l,s) = \frac{d_{i,j}(k,l,s)}{d(i,j,s)}.$$

Clearly, this scheme may be extended for all $n^{th}$-nearest neighboring pixels for all pixels (i,j) in an array, with appropriate truncation at the edges of the array.

One may obtain ratios for the coupling capacitors, relative to their adjacent diode capacitors, for the pixel array of interest using the set of coupling factors, even for the general case where all of the diode capacitances and all of the coupling capacitances are assumed to vary among each other. One may use iterative algorithms (e.g. simulated annealing) to independently calculate the capacitance values. There may be simpler algorithms (e.g. perturbation methods) for more restricted assumptions, such as for the assumption of equal diode capacitances and equal coupling capacitances. An imager average nodal capacitance may be available from conversion gain measurements. Deviations of diode capacitance values may be small, relative to the average, and coupling capacitance values may be small, relative to the diode capacitances.

One may obtain ratios for the coupling capacitors, relative to their adjacent diode capacitors, even for the general case where all of the diode capacitances and all of the coupling capacitances are assumed to vary among each other. One may use iterative algorithms (e.g. simulated annealing) to independently calculate the capacitance values. There may be simpler algorithms (e.g. perturbation methods) for more restricted assumptions, such as for the assumption of equal diode capacitances and equal coupling capacitances. An imager average nodal capacitance may be available from conversion gain measurements. Deviations of diode capacitance values may be small, relative to the average, and coupling capacitance values may be small, relative to the diode capacitances.

Green's function methods or matrix inversion methods may be used to calculate both diode and coupling capacitances under more constrained experimental conditions, such as for example a uniform flat field, only single pixel reset, and uniformity of all coupling capacitances, and separately, uniformity of all diode capacitances. Separate kernels may be used to obtain the corresponding charge-to-voltage coupling factors.

Various modifications may be made to the disclosed embodiments without departing from the scope of the invention as claimed below. For example, instead of setting all the pixels to the first voltage $v_0$ before selectively setting a subset to the second voltage $v_1$, for some embodiments a flat field may be imaged so that all the pixels accumulate a first charge $q_0$. For such embodiments, one may perform an iterative analysis where to calculate an implied voltage coupling, calculate the implied capacitance correction, then perform a localized background subtraction to remove illumination non-uniformities, and then re-calculate the voltage coupling until convergence of the calculated coupling value. Furthermore, for some embodiments, instead of setting the subset of pixels to the second voltage $v_1$, a beam spot may be used to illuminate only the pixels in the subset, one at a time, or a patterned beam may be used to evenly illuminate the pixels in the subset, more than one at a time so that the subset accumulates a second charge $q_1$. Similar remarks as discussed with respect to analysis for the flat field also apply to the analysis of the subset of pixels.

Furthermore, some embodiments may not utilize a flat illumination field, and for some embodiments, the subset of pixels need not be a regular spaced sub-array.

Figure 3:
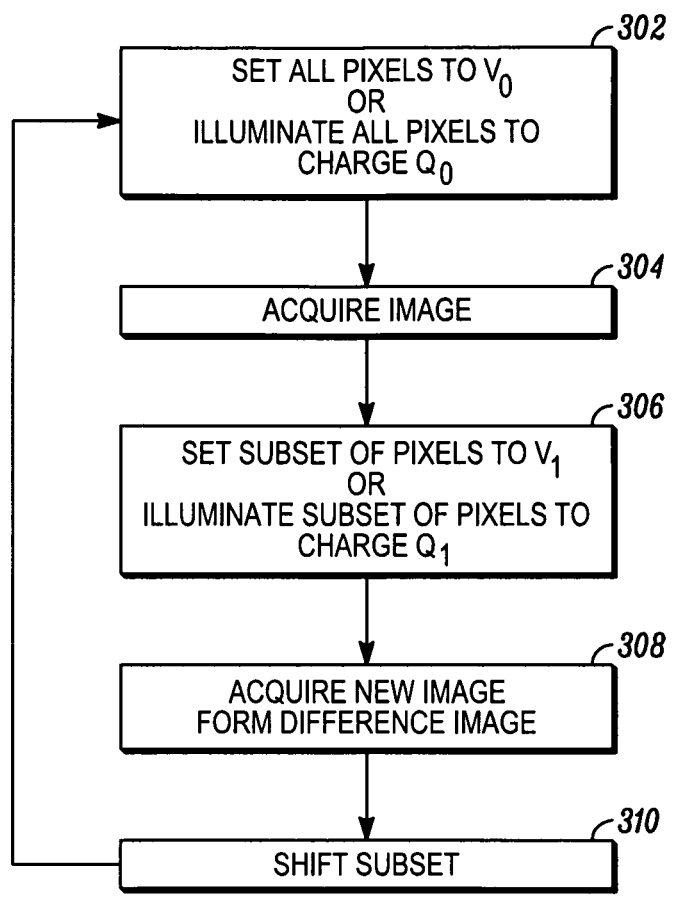
FIG. 3 illustrates a procedure according to an embodiment.

Some of these procedures are illustrated in the flow diagram of FIG. 3, where in process 302 all the pixels are set to the first voltage $v_0$, or in the case of a different procedural mode, all the pixels are instead illuminated with a flat field so that all the pixels accumulate the first charge $q_0$. In process 304, the image is acquired. In process 306, some pre-selected subset of the pixels in the array are set to the second voltage $v_1$, or in the case of a different procedural mode, the pixels in this subset are instead illuminated to accumulate the second charge $q_1$. In process 308, a new image is acquired, and a difference image is formed by taking the difference between the previously acquired image and the new image. In process 310, the subset of pixels is shifted, as discussed earlier, and control is brought back to process 302. The procedure stops when the family of all subsets has covered the array.

Throughout the description of the embodiments, various mathematical relationships are used to describe relationships among one or more quantities. For example, a mathematical relationship or mathematical transformation may express a relationship by which a quantity is derived from one or more other quantities by way of various mathematical operations, such as addition, subtraction, multiplication, division, etc. Or, a mathematical relationship may indicate that a quantity is larger, smaller, or equal to another quantity. These relationships and transformations are in practice not satisfied exactly, and should therefore be interpreted as "designed for" relationships and transformations. One of ordinary skill in the art may design various working embodiments to satisfy various mathematical relationships or transformations, but these relationships or transformations can only be met within the tolerances of the technology available to the practitioner.

Accordingly, in the following claims, it is to be understood that claimed mathematical relationships or transformations can in practice only be met within the tolerances or precision of the technology available to the practitioner, and that the scope of the claimed subject matter includes those embodiments that substantially satisfy the mathematical relationships or transformations so claimed.

What is claimed is:
1. A system comprising:
an array of pixels; and
a controller coupled to the array of pixels, the controller configured to:
acquire a first family of images, wherein each image in the first family of images is a first image based on setting a reset voltage of each pixel in the array to a first voltage;
acquire a second family of images, wherein each image in the second family of images is a second image based on setting only those pixels in a subset of the array to a second voltage, the first voltage being different from the second voltage, the subset being less than an entirety of pixels in the array of pixels, and wherein each image in the second family of images is based on a different subset of pixels in the array; and form a family of difference images, wherein each difference image in the family of difference images is formed based on a difference between one image in the first family of images and one image in the second family of images.

2. The system as set forth in claim 1, where the family of subsets covers the array.

3. The system as set forth in claim 1, wherein the first image is based on an average of voltage readouts by the controller based on setting the reset voltage of each pixel in the array to the first voltage, and the second image is based on an average of voltage readouts by the controller based on setting only those pixels in the subset of the array to the second voltage.

4. A system comprising:
an array of pixels; and
a controller coupled to the array of pixels, the controller configured to:
    acquire a first family of images, wherein each image in the first family of images is a first image based on setting a reset voltage of each pixel in the array to a first voltage;
    acquire a second family of images, wherein each image in the second family of images is a second image based on setting only those pixels in a subset of the array to a second voltage, the first voltage being different from the second voltage, and wherein each image in the second family of images is based on a different subset of pixels in the array;
    acquire a first averaged image based on an average of images in the first family of images;
    acquire a second averaged image based on an average of images in the second family of images; and
    form an averaged difference image based on a difference between the first and second averaged images.

5. The system as set forth in claim 1, the controller is further configured to perform calculation of one or more coupling factors between pixels in the array of pixels based on the family of difference images.

6. The system as set forth in claim 5, wherein each coupling factor in the one or more coupling factors is between a particular pixel and at least one nearest neighbor or at least one next-to-nearest neighbor of the particular pixel.

7. The system as set forth in claim 5, wherein the one or more coupling factors are capacitive coupling factors.

8. The system as set forth in claim 5, wherein the perform calculation is selected from the group consisting of simulated annealing calculation methods, perturbation calculation methods, Green's function calculation methods, and matrix inversion calculation methods.

* * * * *